United States Patent [19]

Park

[11] Patent Number: 5,295,617
[45] Date of Patent: Mar. 22, 1994

[54] PRESSURE DEVICE FOR A PINCH ROLLER OF A VIDEO CASSETTE RECORDER

[75] Inventor: Il Mo Park, Seoul, Rep. of Korea

[73] Assignee: Goldstar Co., Ltd., Seoul, Rep. of Korea

[21] Appl. No.: 855,673

[22] Filed: Mar. 23, 1992

[30] Foreign Application Priority Data

Mar. 23, 1991 [KR] Rep. of Korea .............. 91-3916

[51] Int. Cl.⁵ ............................................ B65H 20/02
[52] U.S. Cl. ................................... 226/181; 226/187
[58] Field of Search ........................ 226/181, 186, 187

[56] References Cited

U.S. PATENT DOCUMENTS

| 3,142,429 | 7/1964 | Ziuny | 226/187 |
| 3,285,486 | 11/1966 | Tamura et al. | 226/181 X |
| 3,589,583 | 6/1971 | Tout | 226/187 X |
| 3,884,407 | 5/1975 | Sugimizu | 226/187 |
| 3,913,814 | 10/1975 | Suzuki | 226/187 |
| 3,964,657 | 6/1976 | Lenk et al. | 226/187 X |

*Primary Examiner*—Daniel P. Stodola
*Assistant Examiner*—Paul T. Bowen
*Attorney, Agent, or Firm*—Birch, Stewart, Kolasch & Birch

[57] ABSTRACT

A pressure device for a pinch roller of a VCR, which includes a pinch lever connected to a function plate which is mounted on the lower portion of a main chassis to be enabled to make reciprocating movement, a pinch arm connected to pinch lever, whereby when the function plate moves the pinch lever to rotate and this rotation is directly transmitted to the pinch arm so that a pinch roller is pressed against a capstan shaft by a predetermined pressure. Therefore, the pressure device of the present invention is simple in structure, effectively improves the operation thereof and remarkably reduces size of the VCR having the pressure device.

2 Claims, 2 Drawing Sheets

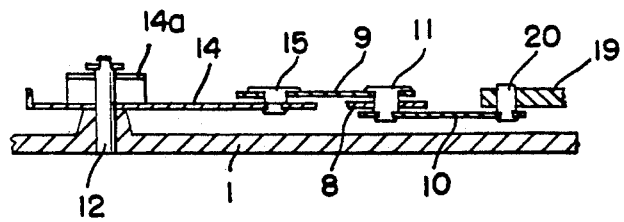
FIG. 4
PRIOR ART
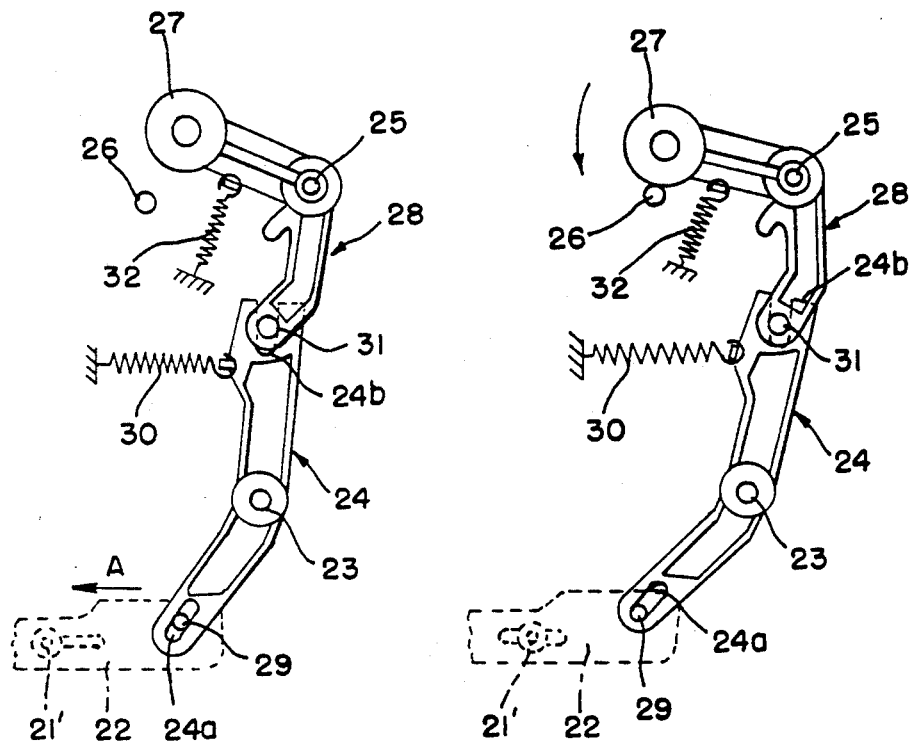
FIG. 5   FIG. 6
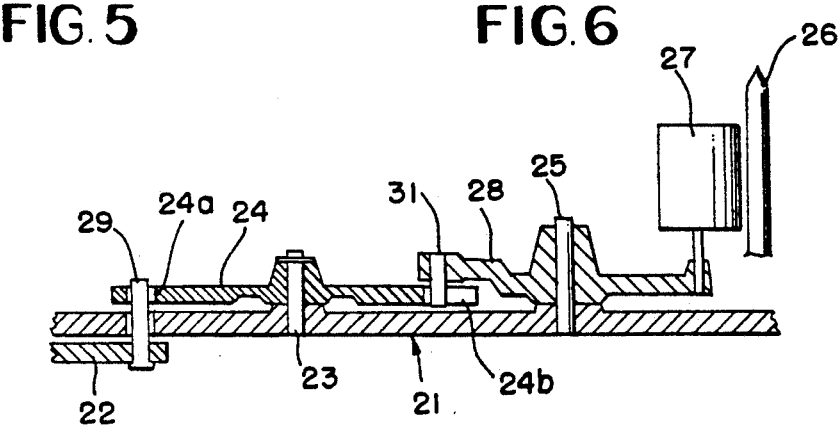
FIG. 7

PRESSURE DEVICE FOR A PINCH ROLLER OF A VIDEO CASSETTE RECORDER

BACKGROUND OF THE INVENTION

1. Field of the Invention

The present invention relates to a pressure device for a pinch roller of a video cassette recorder (hereinafter "VCR") and more particularly, to a pressure device for a pinch roller which is simple in structure so that the pressure device can efficiently improve its operation and productivity with low cost, and contribute to the simplification of VCR.

2. Description of the Prior Art

Various types of pressure devices for a pin roller of a VCR are well known in the art. One of such prior art pressure devices as shown in FIGS. 1 to 4 has a complicated structure. The conventional pressure device includes a function arm 2 disposed under a main chassis 1 for rotating by itself about a first shaft pin 3, on one end of the function arm 2, a function plate 4 is disposed for reciprocally moving through a guide pin in the direction indicated by arrow A as shown in FIG. 1. Since a locking pin 6 of the function plate 4 is inserted into a locking hole 2a of the function arm 2, the function arm 2 rotates in accordance with the movement of the function plate 4.

On the other end of the function arm 2, a first connecting pin 2b protrudes upward through a guide hole 1a of the main chassis 1. The first connecting pin 2b is provided with a first link 8 rotatably connected to the first connecting pin 2b at one end of the first link 8 to be always pressed to the left side of the drawing by elastic force of a first tension coil spring 7. Second and third links 9 and 10 are rotatively connected to the other of the connecting pin 2b through a second connecting pin 11.

A pinch lever 14 is connected to the second link 9 by a third connecting pin 15 and which is rotatably mounted on the main chassis 1 by means of a second shaft pin 12 of a pinch guide hole 14a and is resiliently supported by elastic force of a second tension coil spring 13 so that the second link 9 rotates in the clockwise direction. A pinch arm 19 having a pinch roller 18 which is pressed against a capstan shaft 17 is connected to the other of the third link 10 by a fourth connecting pin 20 and is rotatably mounted on a third shaft pin 16 of the main chassis 1.

Accordingly, as shown in FIG. 1, when play mode signals (not shown) of the conventional pressure device for the pinch roller of the VCR are applied in a stop mode while the pinch roller 18 is some distance away from the capstan shaft 17, the function plate 4 driven by a drive source (not shown) moves in the direction indicated by arrow A. Since the locking pin 6 of the function plate 4 is inserted in the locking hole 2a of the function arm 2, the function arm 2 rotates in a clockwise direction about the first shaft pin 3. And the first link 8 connected to the first connecting pin 2b of the function arm 2 overcomes elastic force of the first tension coil spring 7 and moves from the state shown in FIG. 1 to the state shown in FIG. 2. At the same time, the pinch lever 14 connected to the second link 9 overcomes the elastic force of the second tension coil spring 13 and rotates about the second shaft pin 12 in the counterclockwise direction. The pinch arm 19 connected to the third link 10 revolves in the counterclockwise direction about the third pin 16, thereby forcing the pinch roller 18 of the pinch arm 19 to contact the capstan shaft 17. At this point, the elastic force of the second tension coil spring 13 which supports the pinch lever 14, delivers the pressure force and forces the pinch roller 18 to press against the capstan shaft 17 as well. Additionally, the elastic force of the first tension coil spring 7, which supports the first link 8, works as the restoring force when the pinch arm 19 returns from the play mode to the stop mode.

However, the conventional pressure device for a pinch roller of a VCR has many components involved in the series of procedures by which the reciprocation movement of the function plate 4 is converted to a pressure movement which forces the pinch roller 18 to press against the capstan shaft 17. As a result, this large number of parts, and attendant cumulative size tolerances for the individual parts, reduce reliability of operation. In addition, large numbers of component parts increase production cost, decrease productivity, and hinder minimization of the sizes of products.

SUMMARY OF THE INVENTION

Accordingly, it is an object of the present invention to provide a pressure device for a pinch roller of a video cassette recorder, which eliminates the above problems encountered in a conventional pressure device for a pinch roller of a video cassette recorder.

Another object of the present invention relates to a pressure device for a pinch roller, which includes a function plate operatively connected to the lower portion of a main chassis, a pinch lever rotatively connected to the function plate, and a pinch arm operatively connected to a pinch roller, whereby force of the movement of the function plate is directly transmitted to the pinch arm through the pinch lever so that it is simple in structure and of low cost, and produces a small size VCR.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention relates to a pressure device for a pinch roller of a VCR, which includes a pinch lever connected to a function plate which is mounted on the lower portion of a main chassis to be enabled to make reciprocating movement, a pinch arm connected to pinch lever, whereby when the function plate moves the pinch lever to rotate and this rotation is directly transmitted to the pinch arm so that a pinch roller is pressed against a capstan shaft by a predetermined pressure. Therefore, the simple structure of the pressure device of the present invention can effectively improve its operation and remarkably reduce the size of the VCR having the pressure device.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 3 and 4 are cross-sectional view of FIG. 1;

FIG. 5 is a dramatic plane view showing the pressure device of a pinch roller of VCR of the present invention in a stop mode position;

FIG. 6 is a dramatic plane view showing the pressure device of a pinch roller of VCR of the present invention in a play mode position; and FIG. 7 is a cross-sectional view of FIG. 5.

DESCRIPTION OF THE PREFERRED EMBODIMENTS

Figure 1:
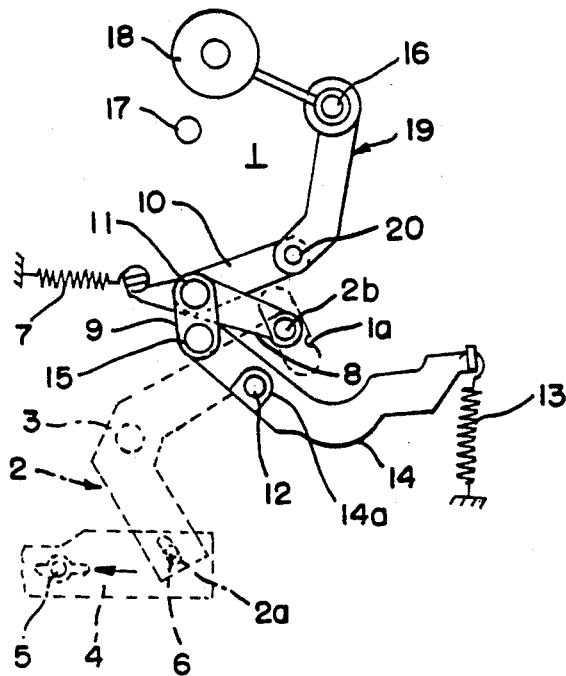
FIG. 1 is a diagrammatic plane view showing a conventional pressure device of a pinch roller in a stop mode position.
Figure 2:
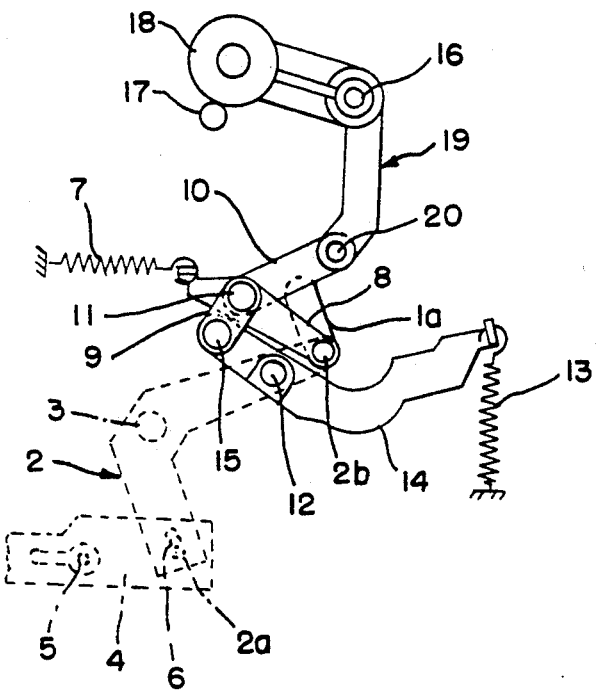
FIG. 2 is a diagrammatic plane view showing a conventional pressure device of a pinch roller in a play mode position.
Figure 3:
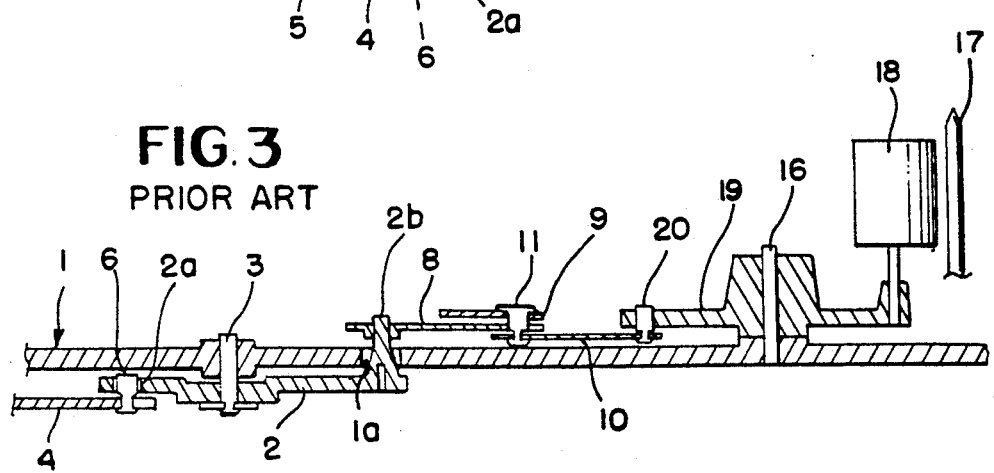

Referring now in detail to the drawings for the purpose of illustrating preferred embodiments of the present invention, the pressure device of a pinch roller of VCR as shown in FIGS. 5, 6, and 7, comprises a function plate 22 installed on the lower part of a main chassis 21 enabling it to make reciprocating movements guided by a guiding pin 21', a pinch lever 24 which rotates centered on a shaft pin 23 relative to the movement of the function plate 22, and a pinch arm 28 which rotates centered on a second shaft pin 25 by directly receiving its rotation force from the pinch lever 24, thereby forcing a pinch roller 27 to press against a capstan shaft 26.

A first locking pin 29 of the function plate 22 is inserted into a locking hole 24a of the pinch lever 24 for making the pinch lever 24 turn to some degree through the movement of the function plate 22. In addition, one end of a first tension coil spring 30 is fixed to the pinch lever 24 and is supported in the counterclockwise direction, centered on the first shaft pin 23 while the other end of the pinch lever 24 has a locking groove 24b. A second locking pin 31 is fixed to one end of a pinch arm 28 and is inserted into the locking groove 24b of the pinch lever 24. Also, one end of a second tension coil spring 32 is also fixed to the pinch arm 28 so that the pinch arm 28 is supported by the elastic force in the counterclockwise direction, centered on the second pin 25.

The pressure device of a pinch roller according to the present invention operates as follows:

As shown in FIG. 5 in the stop mode position, the pinch roller 27 is separated from the capstan shaft 26 by some distance. When play mode signals (not shown) are applied, the drive power from the drive source (not shown) forces the function plate to move in the direction indicated by arrow A.

At this time, the pinch lever 24 overcomes the elastic force of the first tension coil spring 30 and rotates in the clockwise direction centered on the first shaft pin 23 since the locking pin 29 of the function plate 22 is inserted into the locking hole 24a of the pinch lever 24. Accordingly, the pinch arm 28 with the locking pin 31 inserted in the locking hole 24b of the pinch lever 24 rotates in the counterclockwise direction, centered on the second shaft pin 25 thereby forcing the pinch roller 27 to contact the capstan shaft 26. At this time, since the rotation of the pinch arm 28 continues, the second tension coil spring 32 is returned from the extended state. This restoring force functions as pressure force on the pinch roller 27. Also, the first tension coil spring 30 is extended by the rotation of the pinch lever 24, thereby creating a tension force. This tension force functions as restoring force on the pinch lever 24 which rotates about the first shaft pin 23 in the counterclockwise, when the play mode is switched to the stop mode.

Accordingly, the present invention simplifies the structure required by directly transmitting the movement force of the function plate 22 to the pinch arm 28 through the pinch lever 2 improves product reliability, decreases production cost, increases productivity, and reduces product size and weight.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. A pressure device for a pinch roller in a video cassette recorder consisting essentially of:
   a linearly movable function plate,
   a pinch lever rotatably movable together with said function plate
   a first spring connected to said pinch lever, consisting said pinch roller to separate from a capstan shaft,
   a pinch arm having said pinch roller rotatable together with the rotation of said pinch lever, and
   a second spring connected to said pinch arm, causing said pinch arm to press against said capstan shaft so that the movement of said function plate is directly transmitted to said pinch arm through said pinch lever.

2. The pressure device of claim 1, wherein said pinch lever has a locking groove at the one end thereof and said pinch arm has a locking pin on one end thereof adapted to said locking groove.

* * * * *